United States Patent [19]
Nugent

[11] 3,768,656
[45] Oct. 30, 1973

[54] OIL ACCUMULATOR
[75] Inventor: John B. Nugent, Winthrop, Mass.
[73] Assignee: Massachusetts Institute of Technology, Cambridge, Mass.
[22] Filed: May 28, 1971
[21] Appl. No.: 148,107

[52] U.S. Cl. ............. 210/242, 61/1 F, 210/DIG. 21
[51] Int. Cl. ........................................... E02b 15/04
[58] Field of Search .................. 61/1 F, 5; 210/169, 210/242, DIG. 21

[56] References Cited
UNITED STATES PATENTS

| | | | |
|---|---|---|---|
| 3,688,506 | 9/1972 | Marcocchio | 61/1 F |
| 3,426,902 | 2/1969 | Kilpert et al. | 210/DIG. 21 |
| 3,630,376 | 12/1971 | Price | 210/242 |
| 3,662,891 | 5/1972 | Headrick | 210/242 |
| 3,664,505 | 5/1972 | Brittingham | 210/242 |
| 3,173,865 | 3/1965 | Bosico | 210/169 |
| 3,623,609 | 11/1971 | Ainlay | 210/242 |

FOREIGN PATENTS OR APPLICATIONS

| | | | |
|---|---|---|---|
| 947,026 | 1/1964 | Great Britain | 210/242 |
| 1,528,855 | 5/1968 | France | 210/DIG. 21 |

OTHER PUBLICATIONS

Ocean Industry, Vol. 5, No. 6, Gulf Publishing Company, June 1970, p. 58.

Primary Examiner—Mervin Stein
Assistant Examiner—David H. Corbin
Attorney—Arthur A. Smith, Jr., Martin M. Santa and Robert Shaw

[57] ABSTRACT

A flotatable unit for accumulating oil from the surface of water, essentially comprising a framed member having three sides and open at the top and bottom thereof, and also having an open end called the bow, said member including an appropriately located ramp and baffles. The accumulator is inserted into a line of booms at appropriate intervals. A wave with oil on its surface enters the accumulator, surges up over the ramp, and the oil is trapped in the unit for later removal.

4 Claims, 3 Drawing Figures

INVENTOR.
JOHN B. NUGENT
BY
ATTORNEY

OIL ACCUMULATOR

BACKGROUND OF THE INVENTION

This invention relates generally to anit-pollution apparatus and more particularly to a new and improved oil collection device for use in the containment and collection of oil spills on water.

DESCRIPTION OF THE PRIOR ART

Oil spills on water are the result of accidents occurring during the production, distribution, and consumption of crude oil and its derivatives. Most such accidents involve ship loading and unloading, groundings and collisions, and, to a lesser extent, offshore drilling blowouts and pipe fractures. The oil from these spills floats on the surface of the sea in patches called slicks. A number of different approaches are in use or have been proposed as means for solving this problem, including the use of chemical emulsifiers, collectors, air barriers and booms, described in considerable detail in the literature.

Most such devices, however, are designed to operate only under conditions of very calm sea (little wind) and very low current. For example, a major problem with the commonly used oil boom lies in the fact that oil is carried over the boom by waves and under it by strong currents. Other of the above methods suffer from similar problems and some, at least, are complicated, cumbersome, and expensive to design.

One approach to the art has been the improved oil removal vessel described in co-pending patent application Ser. No. 68,451 entitled "Oil Recovery Apparatus," by the same inventor. This vessel is designed to operate across the surface of the water at a given velocity and to actively collect oil. Another approach has been the improved boom described in copending patent application Ser. No. 106,225 entitled "Improved Boom System for Oil Containment," again by the same inventor.

Where the oil from the spill is being driven shoreward, along the coastline by wind and/or current over a relatively long front, it is often desirable to employ a system of booms strung out offshore to contain the oil before it reaches the beach and then some means of collecting it.

This could possible be handled by employing the improved boom of the inventor in conjunction with his aforementioned oil recovery vessel. Preferably, however, the system would be semi-permanent, in that it would be strung out across the coastline to be protected and could be left there indefinitely. Further, it would preferably incorporate within it an oil accumulator which could be left unattended for periods of time and which could be used in conjunction with most types of booms.

SUMMARY

In view of the foregoing limitations existing in presently available systems for containing and collecting oil being driven shoreward from spills, it is a general object of the invention to provide a simple, effective and inexpensive oil accumulating device which can be used in conjunction with presently available booms.

It is another object of the invention to provide oil accumulating apparatus which operates via natural wave motion in relatively rough waters.

These and other objects are met by an oil accumulator comprising a floatatable framed member constituting a box having two sides, which is open at the top and bottom, the stern of said member being enclosed and the bow being open. Appropriately located within the box is a ramp designed such that when a wave with oil on its surface enters the box, it is caused to surge up the ramp and spill over it. The oil is trapped within the box for later removal, but the water is free to exit through the open bottom. Accumulators are inserted at appropriate intervals in the boom system which, in turn, is arranged to channel the oil into the accumulators.

Further objects, features and advantages of the present invention and a better understanding thereof will become apparent in the following detailed description taken in conjunction with the accompanying drawings.

DRAWINGS

PREFERRED EMBODIMENT

Figure 1:
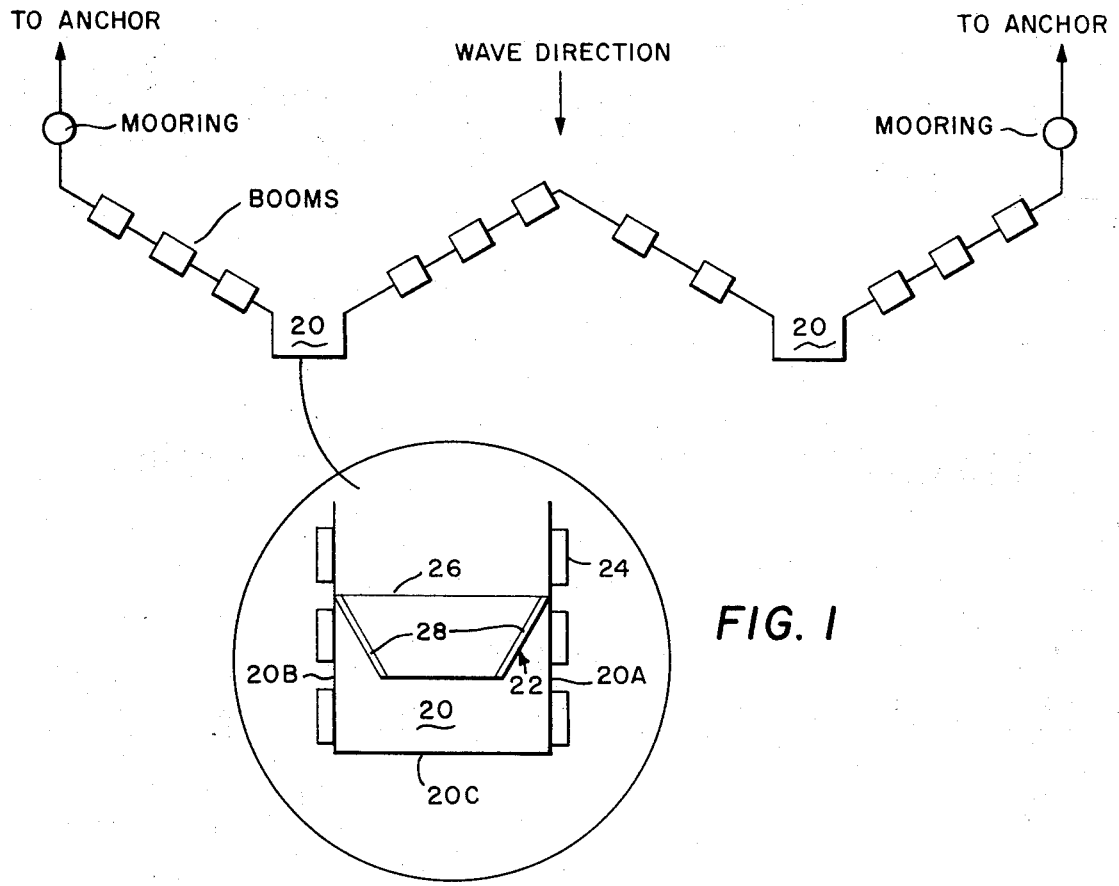
FIG. 1 is a top view of the invention showing its relation to a boom system.

As noted in FIG. 1, oil accumulator 20 is a framed member constituting a box having two sides 20A and 20B, open at the top and bottom. The stern 20C is enclosed while the bow end is open. Within accumulator 20 near the center thereof (for maximum stability) is tapered ramp 22 coupled to sides 20A and 20B and designed such that when a wave carrying oil on its surface enters the bow, it is caused naturally to surge up the ramp and spill over it into the accumulator. The end of the ramp nearest the bow is lower than the other end which, in turn, is higher than the nominal sea level. At the low end of ramp 22 is baffle 26 running horizontally between sides 20A and 20B and vertically such that its bottom edge is as deep as sides 20A and 20B; i.e., the three surfaces are contiguous. Accumulator 20 is maintained partially submerged by the use of flotation members 24 attached to the sides 20A and 20B of unit 20.

When a moderate size wave with oil on its surface enters the box, it surges up the ramp by reason of its contained energy. It spills over the end of the ramp. Because oil is lighter than water, the oil is trapped and the water is free to discharge through the open bottom of the box. By the addition of side walls 28 on the ramp such that the walls are nearer together at the upper end of the ramp, a jetting action (higher lift) may be attained. This higher lift could be utilized with a higher ramp to prevent back-flow of the collected oil when the sea is rough.

As shown in FIG. 1, a series of accumulators 20 are inserted into a line of booms at appropriate intervals. For stability, each of the accumulators 20 is several normal wavelengths long and approximately one-quarter as wide and is inserted in the boom such that the longer dimension is approximately normal to the boom.

Figure 2:
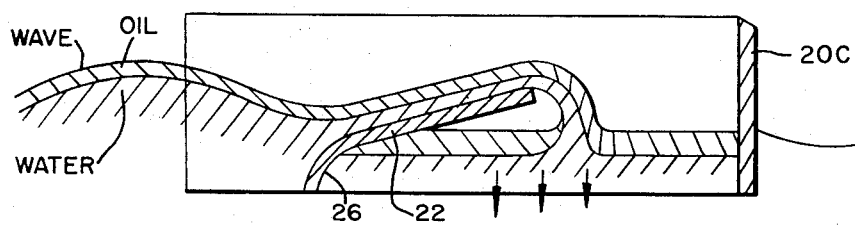
FIG. 2 is a sectional view of the invention showing a stationary ramp.
Figure 3:
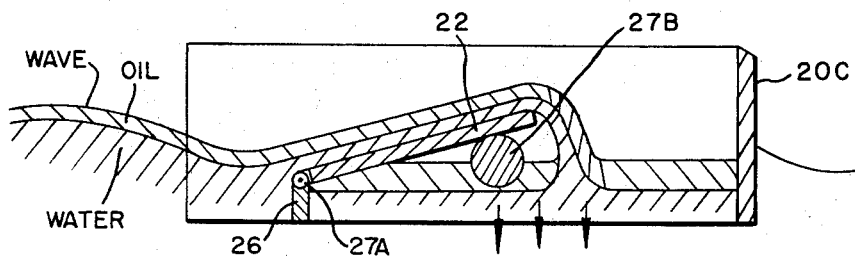
FIG. 3 is a sectional view of the invention showing a ramp employing a pivot.

Ramp 22 may be stationary as depicted in FIG. 2 or pivoted via pivot 27A as shown in FIG. 3. Where pivot 27A is used, at the lower end of the ramp, flotation 27B is coupled to the ramp at the upper end thereof. Pivoting the ramp increases the effectiveness of preventing possible back-flow of the collected oil when the sea is rough. The ramp, whether pivoted or not, may be considered a check valve insofar as the collected oil is concerned.

In order to transport the oil to shore, floating hose (polyethylene) may be employed, the oil being pumped by a wave driven unit mounted on the collector or a shore based suction unit.

For example, although the ramp in the preferred embodiment is tapered, it is understood that the invention will also function with an untapered ramp.

It is understood that a number of possible variations to the above-described apparatus are contemplated while remaining within the scope of the invention.

Having thus described my invention I claim the following:

1. Oil accumulating apparatus for use in conjunction with a line of booms, for the collection and containment of oil on the surface of water, comprising in combination:
   A. A unit having a first side and a parallel second side, an enclosed stern end and an open bow end, said unit being open at its top an its bottom, said unit being several normal wavelengths long and the width of said unit being approximately one-quarter its length;
   B. Means for maintaining said unit partially submerged in said water;
   C. A ramp located within said unit substantially at or near the central region thereof and coupled to said first and second sides, said ramp having a first end and a second end, said first end being nearer to but displaced from the bow end of said unit and lower than the nominal sea level, said ramp further being tapered and having side walls providing a narrowed passageway for producing a lifting action on water and oil moving thereon, said ramp extending upward from said first end such that said second end is sufficiently higher than nominal sea level to prevent back-flow of accumulated oil;
   D. A solid baffle member coupled to said first and second sides of said unit at said first end of said ramp, and extending across the width of said unit, the bottom surface of said baffle member being essentially contiguous with the bottom surface of said sides.

2. The oil accumulating apparatus of claim 1 wherein said ramp is stationary.

3. The oil accumulating apparatus of claim 1 and further including means for pivotally mounting said ramp for free pivotal motion within said unit in response to wave action of said water.

4. The oil accumulating apparatus of claim 3 wherein said pivotally mounting means includes pivoting means coupled to said first end of said ramp and flotation means coupled to said second end of said ramp.

* * * * *